United States Patent
Takahashi et al.

(10) Patent No.: US 6,264,363 B1
(45) Date of Patent: Jul. 24, 2001

(54) TEMPERATURE SENSOR AND METHOD OF MANUFACTURING THEREOF

(75) Inventors: Sotoo Takahashi, Okazaki; Junichi Nagai, Gifu, both of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/359,764

(22) Filed: Jul. 22, 1999

(30) Foreign Application Priority Data

| Jul. 24, 1998 | (JP) | 10-209980 |
| May 28, 1999 | (JP) | 11-150061 |

(51) Int. Cl.[7] .................................................. G01K 7/16
(52) U.S. Cl. .............................. 374/185; 338/25; 338/28; 374/208
(58) Field of Search .................................. 374/185, 208; 338/25, 28

(56) References Cited

U.S. PATENT DOCUMENTS

| 1,613,877 | * | 1/1927 | Dyckerhoff | 374/185 |
| 3,890,588 | * | 6/1975 | Kanaya et al. | 374/185 |
| 4,282,003 | | 8/1981 | Yashin . | |
| 4,437,084 | * | 3/1984 | Clayton, Jr. | 338/25 |
| 4,501,952 | * | 2/1985 | Lehrke | 374/185 |
| 4,560,973 | | 12/1985 | Grimm . | |
| 5,046,857 | * | 9/1991 | Metzger et al. | 374/185 |
| 5,410,291 | * | 4/1995 | Kuzuoka | 338/25 |
| 5,497,139 | * | 3/1996 | Takahashi et al. | 338/28 |
| 5,610,571 | * | 3/1997 | Kuzuoka | 338/25 |
| 6,081,182 | * | 6/2000 | Tomozawa et al. | 338/25 |

FOREIGN PATENT DOCUMENTS

| 0069942 | * | 11/1969 | (DE) | 374/185 |
| 32 17613 | | 11/1983 | (DE) . | |
| 1165237 | * | 10/1958 | (FR) | 374/185 |
| 9-126910 | | 5/1997 | (JP) . | |

* cited by examiner

Primary Examiner—Diego Gutierrez
Assistant Examiner—Madeline Gonzalez
(74) Attorney, Agent, or Firm—Pillsbury Winthrop LLP (57) ABSTRACT

A novel temperature sensor having a radial-type thermistor and a method of fabrication thereof are disclosed. A pair of electrode wires 22 are embedded in a spaced relation from each other substantially in parallel to the axis 21a of a cylindrical thermistor 21, and have an end 22a thereof led out toward an end 21b of the cylinder of the thermistor 21. A pair of core wires (signal lines) 31 arranged in spaced relation from each other substantially in parallel to the cylinder axis 21a are led out from the outer cylinder 33 of a two-core pipe 30 and are connected to an end 22a of each electrode wire 22. The wires 22, 31 are overlapped in such a manner that the diagonal K1 connecting the electrode wires 22 crosses the diagonal K2 connecting the signal lines 31 on the cylinder axis 21a, and coupled to each other by laser welding. In this way, the rod-like electrode wire pair led out of the thermistor in the same direction is connected to the signal line pair, thus securing the coupling reliability between the electrode wires and the signal lines while at the same time reducing the size of the temperature detecting portion.

8 Claims, 5 Drawing Sheets

TEMPERATURE SENSOR AND METHOD OF MANUFACTURING THEREOF

BACKGROUND OF THE INVENTION

1. Field of the Invention

The present invention relates to a temperature sensor used for temperature detection and a method of manufacture thereof or, in particular, to a temperature sensor suitably used as an exhaust gas temperature sensor mounted on a catalyst converter or the like of an exhaust system of automobiles for detecting an abnormal temperature or detecting the deterioration of a catalyst.

2. Description of the Related Art

In the prior art, the temperature detecting apparatus described in Japanese Unexamined Patent Publication (Kokai) No. 9-126910 has been proposed as this type of temperature sensor. This conventional temperature sensor comprises a solid-cylindrical thermistor including a pair of electrodes (platinum) each in the shape of a cylindrical pipe. A pair of signal lines (wires for retrieving a thermistor signal) from a rear two-core pipe (sheath pin) are inserted into the hollow cylindrical electrodes. The electrodes and the signal lines are welded to each other. Further, a metal cap covering the thermistor is coupled to the outer cylinder of the two-core pipe.

This temperature detecting apparatus in which a pair of electrodes led out in one direction of a solid-cylindrical thermistor are connected to a pair of signal lines, respectively, arranged in the direction of extension of the electrodes is generally called a radial-type thermistor.

With the recent trend toward a higher responsiveness of sensors, the current demand is for a smaller diameter of a temperature detecting portion. For the temperature detecting portion to be reduced in diameter, a reduced diameter of the metal cap and hence the thermistor is naturally required. In the prior art described above, however, a platinum pipe embedded in the thermistor is used as a thermistor electrode, and the signal lines are inserted and joined in the pipe. Therefore, the pipe is larger in diameter than the signal lines by a size equivalent to the pipe thickness and the insertion gap.

On the other hand, the thermistor itself requires a volume sufficient for acquiring the desired resistance characteristic. Therefore, the portion embedded with the platinum pipe forms a dead space of the thermistor. An increased pipe diameter thus unavoidably increases the thermistor diameter. Also, as described above, once the diameter of the signal lines is determined, the pipe diameter and thickness are also determined. The reduction in thermistor diameter, therefore, has a limit.

For the thermistor to be reduced in diameter, the thermistor electrodes are required to be changed in shape from a pipe into a rod. A study conducted by the inventors shows, however, that a reduced diameter of the temperature detecting portion of a radial-type thermistor poses a problem depending on relative positions of a pair of rod-like electrode wires and a pair of signal lines. This problem will be described with reference to FIGS. 5A, 5B.

Figure 5A:
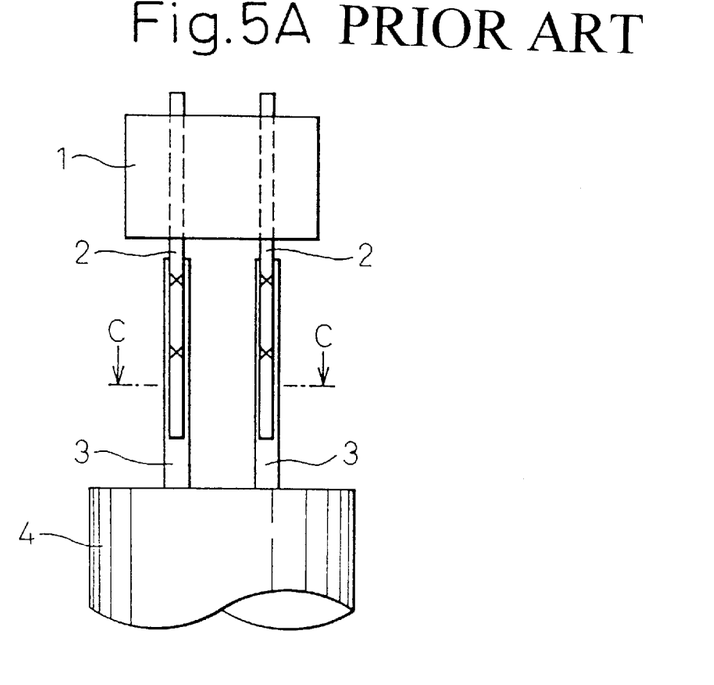
FIG. 5A is a diagram showing a working model fabricated by the present inventor.
Figure 5B:
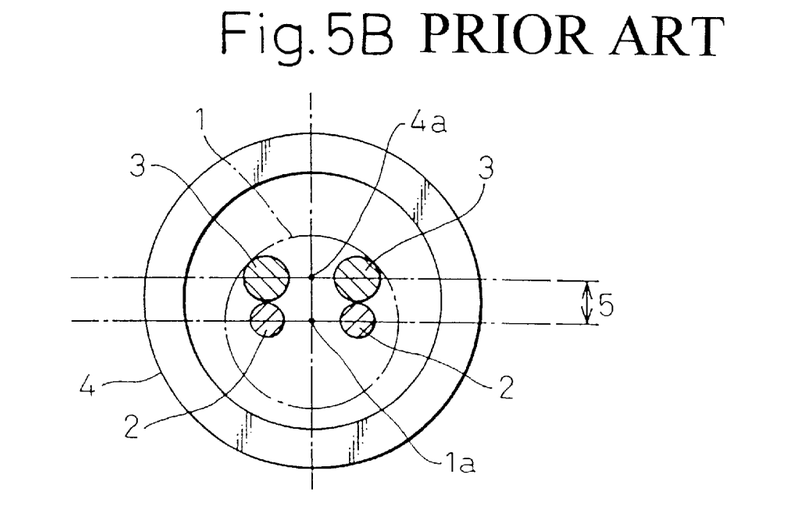
FIG. 5B is a sectional view taken in line C—C in FIG. 5A.

FIGS. 5A, 5B show a working model of a radial-type thermistor fabricated by the inventor. A pair of rod-like electrode wires 2 led out in the same direction from a solid-cylindrical thermistor 1 are connected to a pair of signal lines, respectively, arranged in the same direction as the electrode wires (welded at points A in FIG. 5A). Numeral 4 designates an outer cylinder of the two-core pipe. FIG. 5B is a sectional view taken in line C—C in FIG. 5A.

As shown in FIG. 5B, each of the wires 2 and a corresponding one of the lines 3 are coupled to each other on the same side. The electrode wire pair 2 is normally arranged on lines on both sides of a cylinder axis 1a in order to minimize the body size while securing the required thickness of the thermistor 1. The cylinder axis 1a of the thermistor 1, therefore, is offset from a line connecting the signal lines 3 (by the distance indicated by numeral 5 in FIG. 5) and deviates from the center axis 4a of the outer cylinder of the two-core pipe. A cylindrical metal cap and an insulating member are arranged around the thermistor 1. The eccentric structure of the thermistor 1 described above requires a large diameter of the metal cap and the insulating member, thereby substantially increasing the size of the temperature detecting portion.

Also, the axes 1a, 4a would coincide with each other if the electrode wires 2 and the signal lines 3 are welded at the ends thereof. welding ends to ends, however, makes it difficult to secure the reliability of the junction. Especially, this structure is not desirable for the exhaust gas temperature sensor or the like of automobiles exposed to vibrations and other external forces.

SUMMARY OF THE INVENTION

In view of the problem points described above, the object of the present invention is to provide a temperature sensor comprising a radial-type thermistor, a pair of rod-like electrode wires led out in the same direction from the thermistor and a pair of signal lines led out from the thermistor in the same direction and connected with the electrode wires, respectively, wherein the reliability of coupling between the electrode wires and the signal lines is secured while at the same time reducing the size of a temperature detecting portion.

The present inventors have found that the problem of decentering of the axis occurs for the thermistor in the shape of a parallelepiped solid cylinder or an elliptical solid cylinder as well as a round solid cylinder.

In view of this, a temperature sensor of the present invention comprises a pair of substantially parallel spaced electrode wires embedded along the axis of a solid-cylindrical thermistor and having an end portion thereof led out toward an end of the thermistor, and a pair of signal lines arranged in a substantially parallel spaced relation along the axis of the thermistor and connected to an end of the electrode wires respectively for retrieving the thermistor signal, wherein the electrode wires and the signal lines have a novel arrangement.

Specifically, according to a first aspect of the invention, there is provided a temperature sensor comprising a pair of electrode wires 22, a pair of signal lines 31, and a thermistor 21, wherein the electrode wires 22 and the signal lines 31 are coupled to each other in such an overlapped position that the diagonal line K1 connecting the electrode wires crosses the diagonal line K2 connecting the signal lines 31 as viewed along the direction of the axis 21a of the thermistor 21. The solid cylinder of the thermistor 21 includes a round, parallelepipedal or elliptical solid cylinder, of which the length may be longer or shorter than the width or thickness.

According to this invention, the wires 22, 31 are coupled to each other in such a manner the diagonal lines K1, K2 cross each other. Even in the case where external forces such as vibrations are applied to one overlapped portion of the electrode wires 22 and the signal lines 31 in such a direction as to separate them away from each other, therefore, the electrode wires 22 and the signal lines 31 attract each other at the other overlapped portion, thereby securing the coupling reliability.

With the working model shown in FIG. 5, the coupling reliability is low since external forces such as vibrations exerted on one overlapped portion in such a direction as to separate the wires 2, 3 from each other also act on the other overlapped portion in the same direction.

According to this invention, in contrast, the wires 22, 31 are coupled to each other while being overlapped in such a manner that the two diagonal lines K1, K2 cross each other. Therefore, the crossing point of the diagonal lines K1, K2 can be rendered to coincide with the axis 21a of the thermistor 21. In this way, the increased diameter of the temperature detecting portion which otherwise might be caused by the decentering of the axis of the solid-cylindrical thermistor described above is prevented and the size of the temperature detecting portion can be reduced.

According to a second aspect of the invention, there is provided a temperature sensor wherein an end portion 31a of each signal line 31 and the thermistor 21 are arranged in spaced relation to each other and the signal lines 31 are kept out of contact with the thermistor 21, so that the resistance value of the thermistor 21 is not affected, thereby providing a temperature sensor having a satisfactory thermistor characteristic and a satisfactory temperature characteristic.

The electrode wires 22 led out from the thermistor 21 develops a bending moment due the weight of the thermistor between the thermistor 21 and the coupling point K3 of the signal lines 31 nearest to the thermistor 21.

The present inventor has studied this moment by theoretically taking into account the weight of the thermistor (say, about 0.02 g) and the vibrations (say, 30 G when mounted in a vehicle) exerted on the thermistor in operation.

According to a third aspect of the invention, there is provided a temperature sensor developed based on the study of the bending moment described above, wherein the thermistor 21 and the coupling point K3 of the signal lines 31 nearest to the thermistor 21 are separated from each other with an interval of not more than 1.5 mm. As a result, the electrode wires 22 are prevented from being bent and the thermistor 21 from being decentered by an external force (bending stress).

According to a fourth aspect of the invention, there is provided a temperature sensor, wherein the electrode wires 22 and the signal lines 31 are coupled by being welded at two or more overlapped points K3, K4, and wherein the coupling points K3, K4 are separated from each other with an interval of not more than 3 mm.

According to a fifth aspect of the invention, therefore, the length of the non-coupled portion connecting the two coupling points K3, K4 is not longer than 3 mm, so that even in the case where the wires 22, 31 are made of different materials or have different coefficients of thermal expansion, the thermal deformation or breakage thereof can be prevented.

According to a sixth aspect of the invention, there is provided a temperature sensor, wherein a pair of the signal lines 31 are held insulated in the metal outer cylinder 33 and led out from the outer cylinder 33 toward the thermistor 21, and wherein the interval between the end 33b of the outer cylinder 33 from which the signal lines 31 are led out and the thermistor 21, i.e. the length of the lead-out portion of the lines 22, 31 is not more than 5 mm. This aspect of the invention has also been developed based on the study of the bending moment described above, and can prevent the bending and hence the decentering of the electrode wires 22 and the signal lines 31.

According to a seventh aspect of the invention, there is provided a method of manufacturing a temperature sensor as described in any one of the first to sixth aspects, comprising the step of welding by laser the overlapped portions between the electrode wires 22 and the signal lines 31. According to this aspect of the invention, the laser welding can form a fused portion where the wires are positively fusion welded to each other. Thus, a high coupling reliability of the wires 22, 31 can be secured.

The reference numerals attached to the respective means above represent an example of correspondence with the specific means included in the embodiments described below.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

Figure 1:
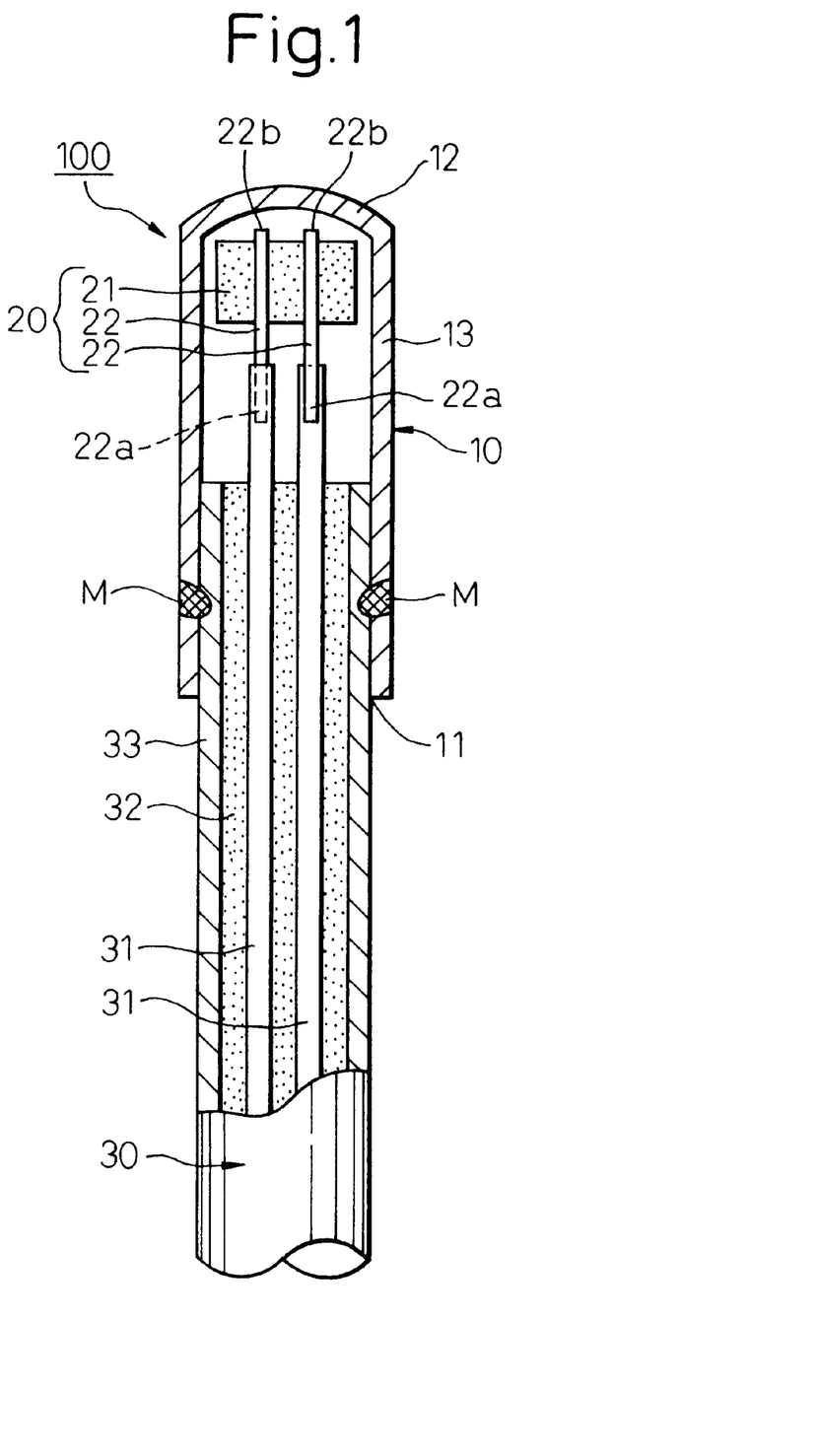
FIG. 1 is a partly cutaway sectional view showing a temperature sensor according to an embodiment of the invention.

An embodiment of the invention shown in the drawings will be explained below. This embodiment will be explained on the assumption that a temperature sensor according to this invention is used as an exhaust gas temperature sensor mounted on an exhaust gas purification system of automobiles, such as a catalyst converter, for detecting an abnormal temperature or the degeneration of a catalyst. FIG. 1 is a partly cutaway sectional view showing a temperature sensor according to an embodiment of the invention and primarily shows a configuration of the temperature detecting portion (sensor element).

In FIG. 1, numeral 10 designates a bottomed cylindrical cap (case) made of a heat-resistant metal such as SUS310S, which includes a hollow cylindrical portion 13 having an end constituting an opening 11 and an enclosed portion 12 for enclosing the other end of the cylindrical portion 13. The thickness of the cap 10 is 0.3 mm, and the internal diameter thereof is 2.5 mm, for example. The temperature sensor 100 is mounted on the exhaust pipe or the like of the automobile with the enclosed portion 12 thereof at a forward end in such a manner that the enclosed portion 12 is in contact with the exhaust gas of the automobile.

Figure 2A:
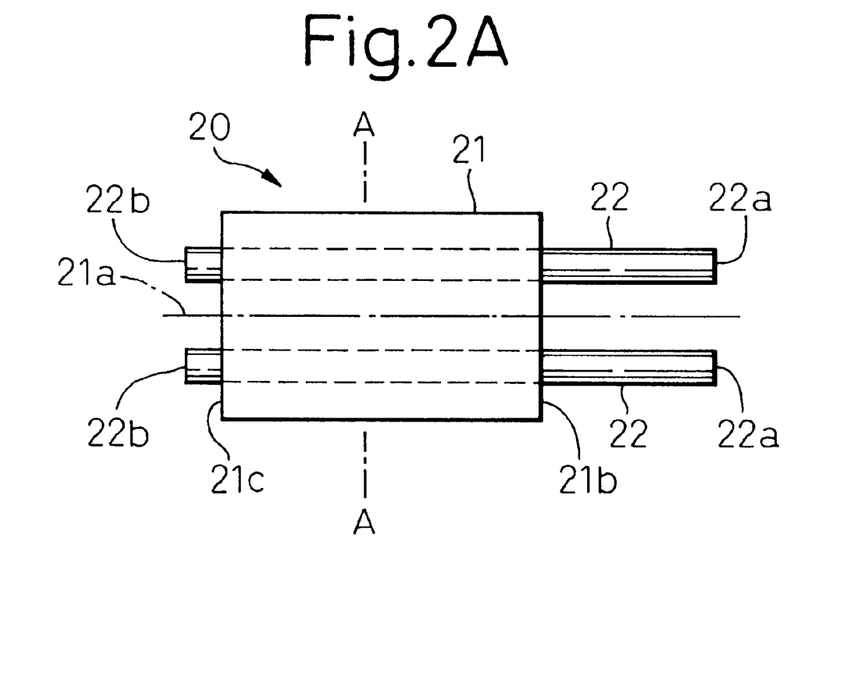
FIG. 2A is a diagram showing a configuration, in an enlarged form, of a thermistor element of the temperature sensor shown in FIG. 1.
Figure 2B:
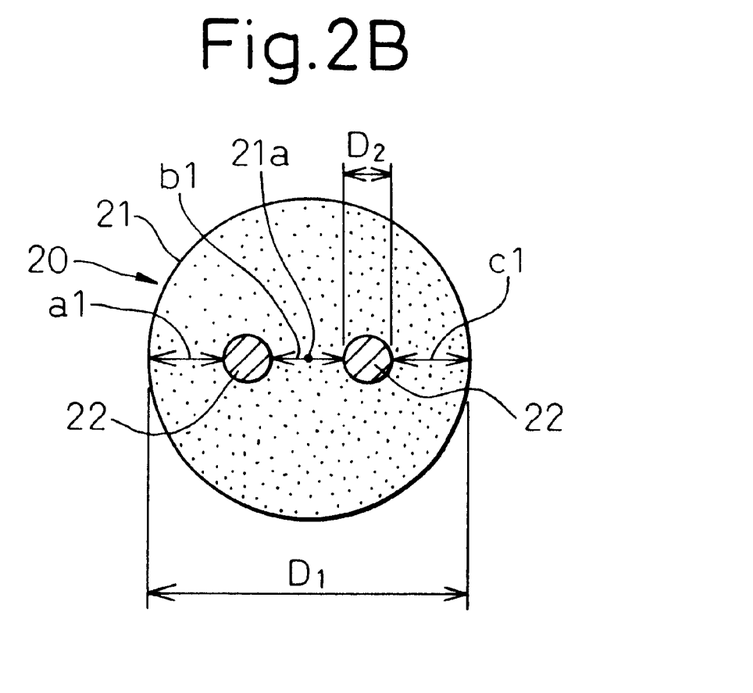
FIG. 2B is a sectional view taken in line A—A in FIG. 2A.

A thermistor element 20 constituting a radial-type thermistor is arranged in the cap 10 in the neighborhood of the enclosed portion 12 in the cylindrical portion 13 in order to improve the temperature detection characteristic. The thermistor element 20 includes a thermistor (thermistor portion) 21 formed into a solid cylinder and a pair of rod-like electrode wires 22 embedded in the thermistor 21 for retrieving the thermistor signal. The configuration, in an enlarged form, of the thermistor element 20 is shown in FIG. 2A and the sectional view taken in line A—A in FIG. 2A is shown in FIG. 2B.

The thermistor 21 is made of a heat-resistant thermistor material such as a ceramic semiconductor of Cr—Mn—Y group, and has a solid-cylinder axis 21a thereof arranged in parallel to the axis of the case 10. A pair of the electrode wires 22 embedded in the thermistor 21 for retrieving the output (resistance-temperature characteristic) as a thermistor signal from the thermistor 21, and are made of a wire material having a superior heat resistance and output characteristic such as an alloy of platinum and iridium (Pt—Ir) or an alloy of platinum and rhodium (Pt—Rh).

The electrode wires 22 are arranged in spaced relation with each other in parallel to the solid cylinder axis 21a of the thermistor 21 on both sides thereof. Also, an end portion 22a of each electrode wire 22 is led out of an end portion 21b of the solid cylinder of the thermistor 21 located nearer to the opening 11 of the cap 10. The other end portion 22b of each electrode wire 22 is exposed to the other end potion 21c of the solid cylinder of the thermistor 21 located nearer to the enclosed portion 12 of the cap 10.

An example of the dimensions of the thermistor 20 shown in FIG. 2B will be described. The diameter $D_1$ of the diametrical section of the thermistor 21 is 1.6 mm, the diameter $D_2$ of each of the electrode wires 22 is 0.30 mm, the thickness (i.e. the interval between the electrode wires 22) b1 of the portion of the thermistor 21 along the diametrical direction between the electrode wires 22 is 0.50 mm, and the thickness a1, c1 of the diametrical portion of the thermistor 21 between the outer peripheral surface thereof and the electrode wire pair 22 are both 0.25 mm. Also the length of the solid cylinder of the thermistor 21 is 1.0 mm.

The output of the thermistor element 20 is retrieved from the two poles of the electrode wire pair 22, and transmitted to an external control circuit from the two-core pipe (wiring member) 30 located at an end portion 21b of the solid cylinder of the thermistor 21. The two-core pipe 30 includes a pair of core wires (signal lines) 31 made of stainless steel (such as SUS310S with wire diameter of 0.35 mm), dielectric powder 32 such as MgO and an outer hollow cylinder 33 of stainless steel (such as SUS310S).

The two-core pipe (sheath pin) 30, which is fabricated from a thick material by repeating the reduction and annealing, contains the dielectric powder 32 in highly dense state and has the two core wires 31 firmly held in the outer cylinder 33. The hollow cylindrical portion 13 of the cap 10 is wrapped with the outer hollow cylinder 33 in the opening 11, and the inner peripheral surface of the cylindrical portion 13 is circumferentially welded with the outer peripheral surface of the outer cylinder 33 at the wrapped portion (the portion indicated by character M in FIG. 1), thus fixing the cylinders 13 and 33 to each other.

The pair of the core wires 31 are arranged in spaced relation with the same interval as the pair of the electrode wires 22 on both sides of the center axis 33a of the outer cylinder 33 (FIG. 3A) in parallel to the center axis 33a. The core wires are led from the outer cylinder 33 and the dielectric powder 32 to the thermistor 21 side, and connected with the electrode wires 22, respectively, at the portion thereof thus led out. The core wires 31 may be made of nichrome or an alloy such as Fe—Cr—Al or Ni—Cr—Fe as well as stainless steel.

Figure 3A:
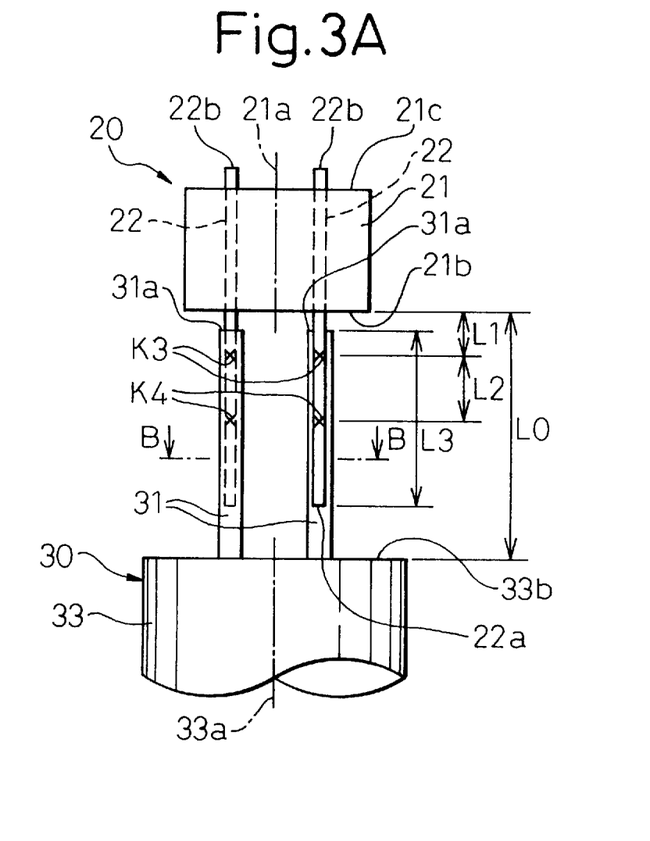
FIG. 3A is a diagram showing the structure, in enlarged form, of the portion of the temperature sensor of FIG. 1 where a thermistor element and a two-core pipe are connected to each other.
Figure 3B:
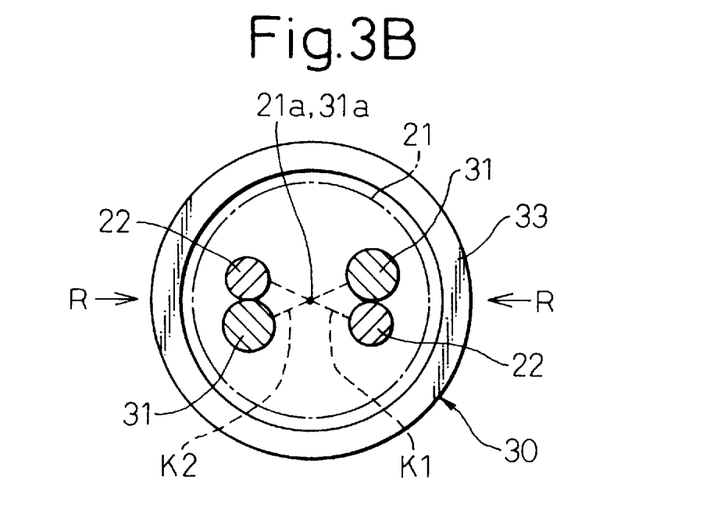
FIG. 3B is a sectional view taken in line B—B in FIG. 3A.

The connecting portion between the core wires 31 and the electrode wires 22 is shown in detail in FIGS. 3A, 3B.

FIG. 3A is an enlarged view of the connecting portion, and FIG. 3B is a sectional view taken in line B—B in FIG. 3A. The thermistor 21 is also indicated by a one-dot chain line. As is shown in FIG. 3B, the electrode wires 22 and the signal lines 31 are coupled in overlapped relation to each other in such a manner that the diagonal connecting the electrode wires 22 (the dashed line K1 in FIG. 3B) and the diagonal connecting the signal lines (dashed line K2 in FIG. 3B) cross each other as viewed from the solid cylinder axis 21a of the thermistor 21.

In similar fashion, as viewed from the solid cylinder axis 21a of the thermistor 21, the crossing point of the diagonals K1 and K2 coincides with the solid cylinder axis 21a of the thermistor 21, which in turn coincides with the center axis 33a of the outer cylinder 33 of the two-core pipe 30. The main feature of this embodiment lies in that the wires 22, 31 are configured with the diagonals K1, K2 thereof crossing as described above thereby to prevent the decentering of the thermistor 21.

In this example, the overlapped portions of the wires 22, 31 are each coupled by laser welding at two points for a total of four points (indicated by K3 and K4 in FIG. 3A). Though not shown, the wires 22, 31 are actually coupled to each other by the fused portion formed in the contact boundary between them.

Also, an end 31a of each signal line 31 nearer to the thermistor 21 is disposed in spaced relation with a solid cylinder end 21b of the thermistor 21.

Further, the distance L1 between the coupling portions K3 of the signal lines 31 nearest to the thermistor 21 and the solid cylinder end 21b of the thermistor 21 is not more than 1.5 mm (1.5 mm in this example), and the distance L0 between the end 33b of the outer cylinder 33 of the two-core pipe 30 where the signal line pair 22 is led out and the solid cylinder end 21b of the thermistor 21 is not more than 5 mm (5 mm in this example).

These dimensions are values taking into account the bending moment of the wires 22, 31 for L1, L0. Specifically, assuming that the weight of the thermistor 21 (including the weight of the electrode wires 22 embedded therein) is about 0.02 g, for example, as normally used, and that the vibration exerted on the thermistor in operation is 30 G, for example, which is the vibration level when mounted on the vehicle in normal cases, the bending moment is calculated with the bending stress exerted on the wires 22, 31 along the diameter of the thermistor 21.

Also, according to this embodiment, the bending moment corresponding to the bending stress described above is also determined by taking the material of the wires 22, 31 into account. In the case where a platinum wire having a diameter $D_2$ of 0.3 mm is used as the electrode wires 22 and a SUS310S wire having a diameter of 0.35 mm is used as the signal lines 31, for example, the tensile strength of the platinum wire is about 14 kg/cm$^2$ and that of the SUS310S wire is about 55 kg/cm$^2$.

As shown in FIG. 3A, the distance L2 between the coupling points K3, K4 and the length L3 of the overlapped portion of the wires 22, 31 can be not more than 3 mm (0.4 mm in this case) and about 2.5 mm, respectively.

As described above, the temperature sensor 100 according to this embodiment is configured with the cap 10 and each member in the cap 10 as a temperature detecting portion.

The other end, not shown, of the two-core pipe 30 far from the end thereof inserted into the cap 10 is led to an external control circuit (such as a vehicle control circuit) through a lead wire not shown, so that the output from the thermistor element 20 is retrieved by the control circuit from the two-core pipe 30. Based on this output, the exhaust gas temperature is detected thereby to carry out the optimum engine control operation.

Now, a method of fabricating the temperature sensor 100 having this configuration will be explained.

The thermistor element 20 is formed by embedding a pair of electrode wires 22 in an assembly made of the thermistor material described above and then baking it. Specifically, the cylindrical assembly made of a thermistor material is formed with a pair of through holes in spaced relation substantially parallel to the axis of the solid cylinder.

The cap 10, on the other hand, is fabricated by the drawing (deep drawing) a metal plate such as stainless steel.

In addition to the thermistor element 20 and the cap 10, a two-core pipe 30 made by the reduction and annealing processes described above is prepared. The core wires 31 of the two-core pipe 30 are brought into the electrode wires 22 of the thermistor element 20 in the crossed configuration described above.

The core wires 31 and the electrode wires 22 kept in contact this way are welded by laser. In the welding process, a laser beam is applied substantially in parallel to the contact surface of the wires 22, 31 (in the direction of two arrows R in FIG. 3B) at the coupling points K3, K4 shown in FIG. 3A thereby to form the fused portions (between platinum and SUS, for example) of the wires 22, 31. The conditions for laser beam radiation include the laser power of 2.5 J at the rate of 4 msec per pulse, for example.

Other welding processes usable for this purpose include resistance welding. The study by the inventor shows, however, that the difference of material between the wires 22, 31 makes the laser welding preferable. Assume, for example, that platinum having a melting point of 1769° C. and Vickers hardness of 50 to 100 is used for the electrode wires 22 and SUS310S having a melting of 1450° C. and Vickers hardness of 150 for the signal lines 31.

In resistance welding, if it is used, for joining these electrode wires 22 and the signal lines 31 of different harnesses as described above, the pressure exerted at the time of welding operation would often bend the soft platinum, or the wires 22, 31 are too thin to resist the pressure exerted on them. Also, as compared with the laser welding, the resistance welding is low in power and cannot positively form a fused portion. For these reasons, the inventor has employed laser welding.

After welding the wires 22, 31 in this way, the opening 11 of the cap 10 and the solid cylinder end 21c of the thermistor 21 are placed in opposed relation to each other, and the cap 10 is covered on the thermistor element 20. Then, the portion (designated by M in FIG. 1) where the cylindrical portion 13 of the cap 10 and the outer cylinder 33 of the two-core pipe 30 are wrapped is sealed over the circumference by laser welding or the like. Thus, the temperature sensor 100 is completed.

According to this embodiment, the wires 22, 31 are coupled by being overlapped in such a manner that the diagonals K1, K2 cross each other. An external force such as a vibration (vehicle vibration, for example) which may be exerted on one overlapped portion in such a direction as to separate the electrode wires 22 and the signal lines 31 away from each other functions to attract the electrode wires 22 and the signal lines 31 to each other at the other overlapped portion, thereby securing the reliability of the coupling.

Specifically, in the sectional view of FIG. 3B, assume that an external force is exerted upward on the thermistor 21. At the left overlapped portion, the electrode wires 22 are forced away from the signal lines 31, while the electrode wires 22 are attracted to the signal lines 31 at the right overlapped portion. The opposite is the case when a downward external force is exerted. In the working model shown in FIGS. 5A, 5B, when an upward external force is exerted on the thermistor 1, the electrode wires 2 are forced away from the signal lines 3 at both the right and left overlapped portions.

According to this embodiment, the diagonals K1, K2 are crossed. It is therefore possible that the axis 21a of the cylinder of the thermistor 21 located on the diagonal K1 coincides with the center axis 31a of the two-core pipe 30 located on the diagonal K2 at the crossing point of the diagonals K1, K2. Thus, the increased diameter of the temperature detecting portion which otherwise might occur by the decentering of the solid cylinder axis of the thermistor can be prevented thereby to reduce the diameter of the temperature detecting portion.

Also, according to this embodiment, the end 31a of each signal lines 31 is forced away from the thermistor 21 so that the signal lines are kept out of contact with the thermistor 21. Thus, the resistance value of the thermistor 21 is not affected, thereby producing a temperature sensor having a superior thermistor characteristic and hence a superior temperature characteristic.

Further, according to this embodiment, the distance L1 between the coupling point K3 and the solid cylinder end 21b shown in FIG. 3A is not more than 1.5 mm. It is thus possible to prevent the electrode wires 22 from being bent by the external forces (bending stress) and the thermistor 21 from being decentered.

Also, according to this embodiment, the distance L0 between the lead-out terminal 33b of the signal line pair 22 and the solid cylinder end 21b shown in FIG. 3A is not more than 5 mm, and therefore the bend and decentering of the electrode wires and the signal line 31 are prevented.

According to this embodiment, the wires 22, 31 are coupled to each other by laser welding. Therefore, positive fusion is realized at the welded portions, thereby making it possible to secure a higher coupling reliability of the wires 22, 31.

The temperature sensor 100 according to this embodiment has been subjected to a test by repeating the vibrations of 30 G, 240 Hz as often as $1 \times 10^7$ time, and it has been found that neither the wires 22, 31 nor the coupling points are broken and no practical problem is posed. With the working model shown in FIG. 5, in contrast, the coupling points have broken.

Furthermore, according to this embodiment, the distance L2 between the coupling points K3, K4 shown in FIG. 3A is set to not more than 3 mm (0.4 mm in this case). This is for preventing the deformation or breakage of the wires 22, 31 due to heat or cold and based on the knowledge described below.

The electrode wires 22 acquire a conductive characteristic by the mechanical contact as it is embedded and shrinkage fitted by baking in the thermistor 21. In the case where it is used at a high temperature of 300 to 1000° C., for example, the material is required to have a high oxidization resistance at high temperatures. The material, therefore, is generally configured of platinum or the like as described above. Also, the core wires 31 of the two-core pipe 30, which need not be made of an expensive platinum material when fixedly welded to the electrode wires 22, are composed of a stainless steel material as described above for its low cost.

Figure 4:
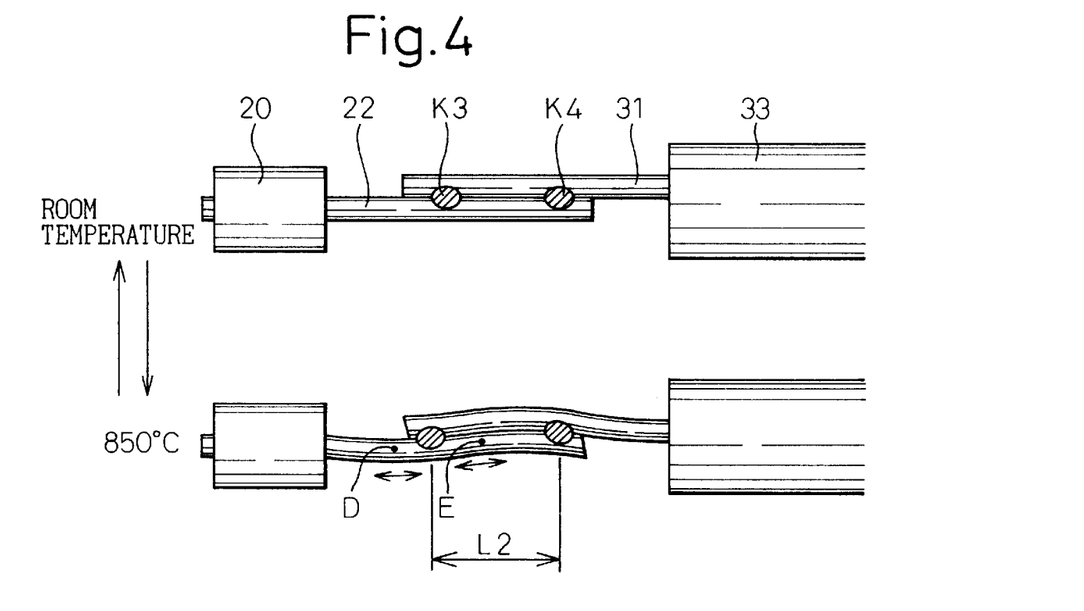
FIG. 4 is a diagram showing the manner in which the connecting portion of FIG. 3A is thermally deformed.

Nevertheless, the electrode wires 22 made of platinum and the core wires 31 made of stainless steel have different coefficients of linear expansion. In the thermal environment alternating between room temperature and high temperatures, as shown in FIG. 4, the displacement due to the thermal expansion occurs at the portions (hereinafter referred to as the portions D and E, respectively) indicated by black circles D and E. The repetitive stress (indicated by two arrows in FIG. 4) finally comes to break the electrode wires 22 low in strength. FIG. 4 is a view taken from the left side in FIG. 3A.

The difference ΔL of elongation between the electrode wires 22 and the core wires 31 due to thermal expansion of the distance L2 (distance between welding points) at 850° C., for example, is expressed by equation 1 below.

$$\Delta L = (\alpha s - \alpha p) \times 850 \times L2$$

where αs is the coefficient of linear expansion of the core wires 31 ($16 \times 10^{-6}$ mm/° C. for SUS310S, for example) and αp is the coefficient of linear expansion of the electrode wires 22 ($10 \times 10^{-6}$ mm/° C. for platinum, for example).

It is seen that the shorter the distance L2, the smaller is the value ΔL at high temperatures and so is the displacement, making the breakage more difficult. Ideally, the distance L2 between the coupling points K3 and K4 is zero, in which case ΔL is 0 from equation 1 above, and no breakage occurs. Actually, however, the laser welding of the electrode wires 22 and the core wires 31 produces the penetration of the coupling points K3 and K4 (hatched in FIG. 4) having a diameter of about 0.5 mm. In the case where the distance L2 is not more than 0.5 mm, therefore, the value ΔL can be substantially reduced to zero and no displacement occurs thereby preventing the breakage.

Further, a thermal endurance test (alternation between room temperature and 850° C., for example) was conducted for different distances L2 of 6 mm, 3 mm and 0.5 mm. As a result, the life sustained before the breakage at the portion D or E is about 1.5 to 2 times longer for the distance L2 of 3 mm than for the distance L2 of 6 mm. No breakage has occurred at portion D or E for the distance L2 of 0.5 mm. In this way, the correlation between the displacement and the service life could be proved substantially according to equation 1 above.

The life of a sensor at least twice as long as that of the vehicle could be secured even for the distance L2 of 3 mm as indicated by the life curve determined from the total number of thermal cycles estimated from the actual vehicle life (10 years) and the number of thermal test cycles in a bench endurance test. In this way, the distance L2 between the coupling points K3 and K4 is preferably not more than 3 mm or more preferably not more than 0.5 mm.

(Other Embodiments)

In order to positively prevent the effect of the contact between the thermistor 21 and the inner surface of the cap 10 on the R-T (resistance-temperature) characteristic of the thermistor 21, a cylindrical insulator (insulating member) of a heat-resistant insulating material such as alumina may be covered on the outer periphery of the thermistor 20 thereby to secure the insulation between the thermistor 21 and the inner surface of the cap 10.

Also, the thermistor 21 may assume such a shape, in addition to a solid cylinder having a circular section, as a solid cylinder having an elliptical section or a solid parallelepiped having a hexagonal or square section.

What is claimed is:

1. A temperature sensor comprising:

a thermistor in the shape of a solid cylinder;

a pair of electrode wires embedded in said thermistor in a spaced relation with each other in the direction substantially parallel to the axis of said thermistor, said electrode wires each having an end thereof led out toward an end of said thermistor; and a pair of signal lines arranged in spaced relation with each other in the direction substantially parallel to the axis of said thermistor and each connected to said end of each of said electrode wires for producing a thermistor signal;

wherein each electrode wire is overlapped with and coupled to a respective one of the signal lines, and the electrode wires and signal lines are arranged within the thermistor such that, in a plane perpendicular to the thermistor and intersecting the electrode wires and signal lines, a diagonal line connecting the signal lines crosses a diagonal line connecting the electrode wires.

2. A temperature sensor according to claim 1, wherein an end of each of said signal lines and said thermistor are distant from each other.

3. A temperature sensor according to claim 1, wherein the coupling point of each of said signal lines nearest to said thermistor and said thermistor are distant from each other with an interval of not more than 1.5 mm.

4. A temperature sensor according to claim 1, wherein said electrode wires and said signal lines are coupled to each other by welding at two or more coupling points in the overlapped portions thereof; and wherein said coupling points are distant from each other with an interval of not more than 3 mm.

5. A temperature sensor according to claim 1, wherein said pair of said signal lines is insulatively held in a metal outer cylinder and led out of said outer cylinder toward said thermistor; and wherein the end of said outer cylinder from which said signal line pair is led out and said thermistor are arranged in spaced relation from each other with an interval of not more than 5 mm.

6. A temperature sensor as in claim 1, wherein an intersection of the diagonal lines lies on a central axis of the thermistor.

7. A method of fabricating a temperature sensor, said temperature sensor comprising:

a thermistor in the shape of solid cylinder;

a pair of electrode wires embedded in said thermistor in spaced relation with each other in the direction substantially parallel to the axis of said thermistor, said electrode wires each having an end thereof led out toward an end of said thermistor; and a pair of signal lines arranged in spaced relation with each other in the direction substantially parallel to the axis of said thermistor and each connected to said end of each of said electrode wires for producing a thermistor signal;

wherein said electrode wires and said signal lines are coupled to each other by being overlapped in such a manner that the diagonal connecting said electrode wires and the diagonal connecting said signal lines cross each other on the axis of said thermistor;

wherein the overlapped portion between said wires and said lines is welded by laser.

8. A method of fabricating a temperature sensor comprising:

provide a cylindrical thermistor housing;

arranging a pair of electrode wires and a pair of signal lines within the housing;

connecting an end of each signal line to a respective end of each electrode wire by overlapping a portion of each signal line with a portion of each electrode wire such that a diagonal line connecting said electrode wires and a diagonal line connecting said signal lines cross each other on an axis of the housing; and welding each overlapped portion.

\* \* \* \* \*